United States Patent [19]

Smith

[11] Patent Number: 5,009,405

[45] Date of Patent: Apr. 23, 1991

[54] STRAP WRENCH END ATTACHMENT ASSEMBLY FOR A TWISTED ROPE TORSION BAR

[75] Inventor: Jack E. Smith, Dayton, Ohio

[73] Assignee: General Motors Corporation, Detroit, Mich.

[21] Appl. No.: 423,930

[22] Filed: Oct. 19, 1989

[51] Int. Cl.$^5$ .............................................. B60G 11/18
[52] U.S. Cl. .................................... 267/273; 24/68 E; 267/279; 267/281; 403/373
[58] Field of Search ............... 267/273, 275, 278, 279, 267/280, 281, 154, 148, 149; 403/341, 286, 373; 24/68 E, 68 F, 68 R, 68 CE, 68 T, 273

[56] References Cited

U.S. PATENT DOCUMENTS

| | | | |
|---|---|---|---|
| 1,171,233 | 2/1916 | Murray | 403/373 |
| 2,602,207 | 7/1952 | Kellems | 403/373 |
| 4,073,317 | 2/1978 | Ellis | 24/68 E X |
| 4,531,719 | 7/1985 | Hoppie et al. | 267/279 |

OTHER PUBLICATIONS

Brochure Form No. SW-1-62-R, 999-240 (1 sheet) The Ridge Tool Co., Elyria, Ohio.

*Primary Examiner*—Matthew C. Graham
*Attorney, Agent, or Firm*—R. L. Phillips

[57] ABSTRACT

An end attachment assembly for a twisted rope torsion bar includes an anchor nut and a plurality of strap wrenches. A plurality of tie rods and a washer secure the assembly and transmit the torque. The torison bar is preferably fabricated of a lightweight glass fiber/epoxy composite material formed in a rope. In operation, the application of torque to the anchor nut results in a rotating/pivoting action by the strap wrenches. The strap associated with each strap wrench loops around the torsion bar and overlaps itself in the area of engagement with a cross bar that forms a cam. As the cross bar rotates/pivots and presses against the engaging portion of the strap, the strap firmly grips the torsion rod. The strap resists by frictional engagement any sliding motion over the torsion bar and against itself in the overlapping region. This compressive action adjusts for the diametral change of the torsion bar upon the application of torque and results in a tighter and tighter grip to the torsion bar. The cooperative interaction between the components of the end attachment assembly and the twisted rope torsion bar prevents concentration of stresses.

2 Claims, 2 Drawing Sheets

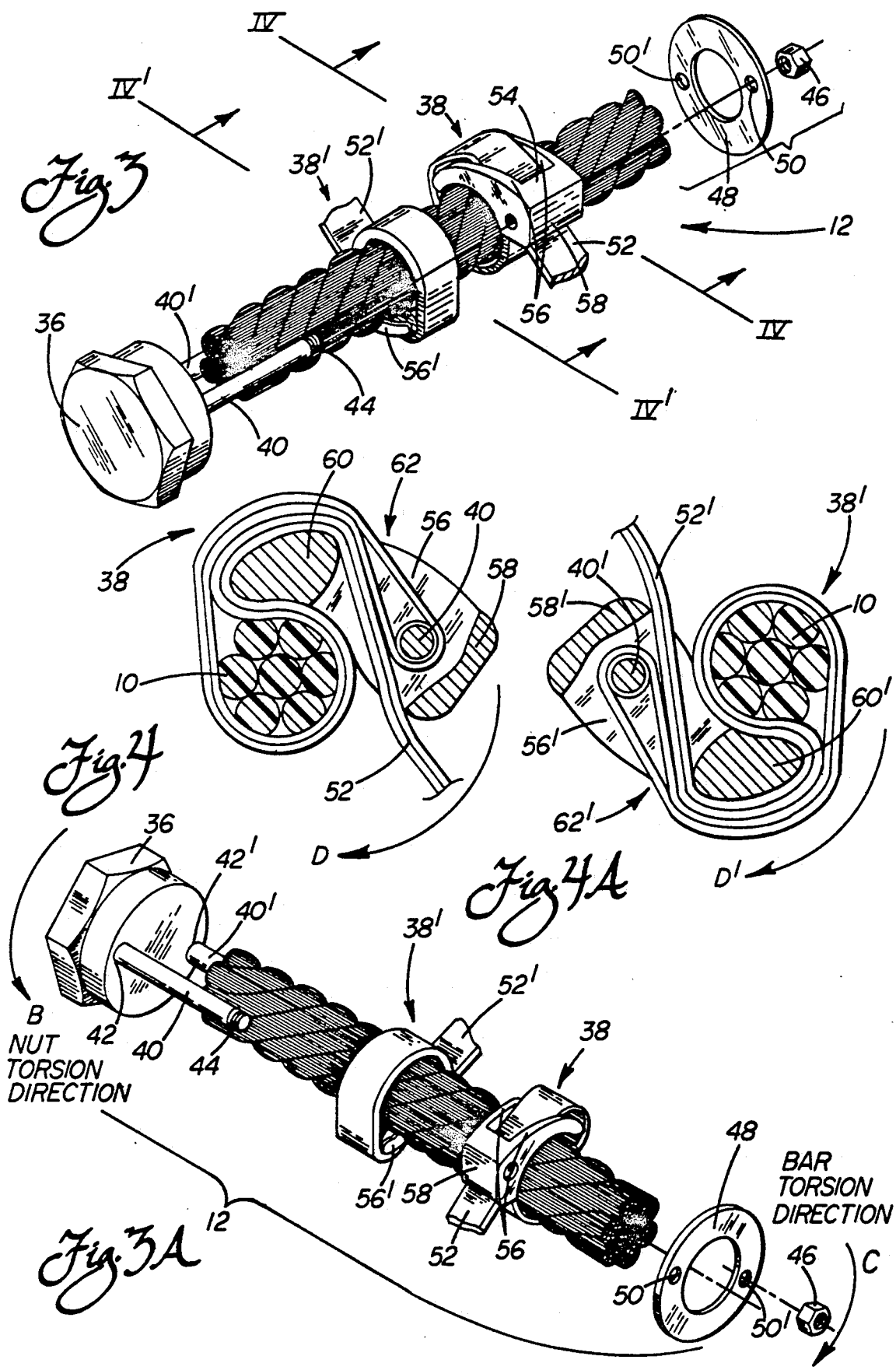

STRAP WRENCH END ATTACHMENT ASSEMBLY FOR A TWISTED ROPE TORSION BAR

TECHNICAL FIELD

The present invention relates generally to an end attachment assembly for a torsion bar, and more particularly to an assembly specifically adapted for use with a torsion bar fabricated of lightweight resin coated glass fibers and formed in the shape of a twisted rope.

BACKGROUND OF THE INVENTION

Mechanical springs are widely used to serve a variety of functions, such as exerting a resilient force, providing flexibility, and storing and absorbing energy. One type of mechanical spring that has found many uses is a torsion bar.

In general, torsion bars are straight bars made of inherently resilient or elastic material, and designed to be subjected to torsional loading, i.e. twisting about its longitudinal axis. The torsion bar is usually solid and circular in cross-sectional configuration, but may also be of square or rectangular cross-section. Torsion bars have many applications; one well-known use being in automotive vehicle suspension systems.

Historically, torsion bars have been fabricated out of metal, such as steel. This provides the desired strength and durability, but does not provide the ideal resiliency due to its relatively high modulus of elasticity. As the cost of component parts for automotive vehicles continues to rise and the need to save weight to meet governmental standards for improved gas mileage increases, the need also arises to design a less expensive and lighter torsion bar.

Thus, designers are continuing to seek to create a torsion bar fabricated of a material with a lower modulus of elasticity. To compliment this goal, a material is being sought to meet the dual requirements of providing greater elasticity and superior strength The end result is a composite material made of resin coated glass fibers. The use of this material provides a lightweight product that is very cost effective. A further advantage is that such a composite material alleviates the critical availability of metal alloys.

A problem has always existed in connecting torsion bars to any mass to be sprung due to the significant stresses existing at the connection regions. Thus, there is a need to improve the connection used in incorporating the new generation torsion bar fabricated of glass fiber/epoxy composite material into the suspension system of a vehicle or other system. Most of the operating components of a vehicle suspension system are fabricated of metal to provide strength. It is thus anticipated that opposing ends of a torsion bar would cooperate with metal components of significant strength and mass.

It is recognized that the desirable elasticity characteristic of a torsion bar providing the amount of deflection necessary to respond to vehicle motion conflicts with the strength requirement needed for use as attachments to the vehicle suspension system. The attachment component requires a high modulus of elasticity to introduce strength to the connection. Strength is inherently reduced when a torsion bar is required to have the necessary elasticity to perform its function.

One approach used in the art involves anchoring a torsion bar fabricated of composite material directly to a metal mounting piece. The torsion bar normally has a tubular configuration and is fitted into a tubular socket in the anchor. This type of direct attachment produces major problems since the torsion bar when fabricated of composite material tends to deflect much more that the metal mounting piece when torque is applied. This action results in the tendency for a shear failure at the attachment interface.

As torsion bars are designed to be increasingly resilient, the attachment design becomes more critical. More specifically, an attachment design is desired to provide the required strength to the connection while mitigating the relative difference in angular deflection between the torsion bar and the attachment anchor. By alleviating the problems associated with the relative deflection difference, the stress concentration between the torsion bar and the anchor attachment is reduced, thus reducing the chance of failure of the torsion bar.

A further improvement in the design of torsion bars for automotive vehicle suspension systems and other uses involves using a bundle of resin coated glass fibers formed into a rod-like shape. Several rod-shaped fiber bundles are then twisted together and set into a rope-like configuration. This produces a twisted rope torsion bar fabricated of lightweight glass fiber/epoxy composite material incorporating the benefits of increased elasticity and resilience offered by the composite material with the higher load capacity offered by the twisted rope configuration. It should be appreciated that while the twisted rope configuration introduces benefits associated with elasticity and resilience, the improved design presents further complications with respect to the attachment component. The uneven non-circular surface of the twisted rope torsion bar increases the difficulty of providing a grip sufficient to allow optimal transmission of torque while minimizing the chance of shear failure at the attachment interface. An improved attachment design is thus needed to allow the twisted rope torsion bar to optimally cooperate with a metal mounting piece and at the same time maintain the reduced stress levels at the attachment interface.

SUMMARY OF THE INVENTION

Accordingly, it is a primary object of the present invention to provide an end attachment assembly for a twisted rope torsion bar allowing harmonious interaction between the twisted rope torsion bar and a sprung mass.

It is still another object of the present invention to provide an end attachment assembly including strap wrenches whose straps contract around a twisted rope torsion bar with the application of increasing torque. In this way, the strap wrenches are influenced to grip the torsion bar tighter as increased torque is introduced.

Still another object of the present invention is to provide an end attachment assembly for a twisted rope torsion bar including a plurality of strap wrenches attached in tight engagement and minimizing the shear loading.

It is another object of the present invention to provide an end attachment assembly for a twisted rope torsion bar including an anchor nut having tie rods for maintaining a plurality of strap wrenches engaging the torsion bar in defined positions and in tight engagement.

It is an additional object to provide an end attachment assembly for a composite, twisted rope torsion bar designed to adjust compressively as the diameter of the torsion bar reduces with the application of increasing torque. Thus, a tight grip between the twisted rope torsion bar and the assembly is continuously maintained in the presence of applied torque, thereby effectively eliminating the possibility of joint failure at the attachment interface.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an end attachment assembly for a twisted rope torsion bar for use in springing a mass is provided. The end attachment assembly offers the desirable qualities of providing positive interaction between the twisted rope torsion bar and the sprung mass and stress reduction capability at the attachment interface.

Advantageously, the end attachment includes an anchor or end nut adapted to engage components of the sprung mass. Since the well-known use of a torsion bar is in an automotive vehicle suspension system, the description that follows focuses on that use. It should be appreciated, however, that the end attachment assembly can be successfully used to connect the twisted rope torsion bar for other applications.

The anchor nut of the assembly is designed to be secured to the vehicle suspension system so that it is retained in a substantially rigid position with respect to angular rotation. It is this rigid engagement that allows torque to be readily transmitted to or taken from the assembly by the torsion bar.

The end attachment assembly of the present invention is contemplated as being used with a torsion bar fabricated from resin coated and twisted glass fibers. The composite material used to fabricate the torsion bar affords increased elasticity and resilience due to its lower modulus of elasticity. The twisted rope orientation of the torsion bar gives a desired degree of strength to the torsion bar. When installed in the working environment, such as in the vehicle suspension system, the torsion bar is preloaded by providing an initial twist sufficient to insure a positive spring action over the expected range of travel.

According to an important aspect of the invention, a plurality of strap wrenches, preferably at least two, are employed to facilitate a secure engagement and provide a means of beneficial compression applied to the torsion bar in response to the introduction of torque. More specifically, each strap wrench is adapted to contract around the bar in response to the application of torque. It can be appreciated that the application of torque to the twisted rope torsion bar causes the diameter of the torsion bar to inherently decrease The contraction of the strap wrenches not only adjusts to this diametral decrease, but also beneficially provides a tighter and tighter grip as torque is applied. This not only assures retention of the grip, but results in a reduction of the stresses normally associated with an interface attachment between the torsion bar and an attachment anchor. The attaching force is spread out over the length of the torsion rod covered by the straps. Thus, it is an important feature of this invention that the stress concentration at the attachment interface between the torsion bar and the attachment assembly is greatly minimized, resulting in a much longer service life.

In a further effort to improve the functional relationship between the twisted rope torsion bar and the end attachment assembly, an even number of strap wrenches are utilized. The strap wrenches are positioned so that the associated straps of adjacent wrenches extend in opposing directions so as to balance the compressive force and to assure full holding force on the torsion bar from opposite sides. This further enhances the stress reduction capability of the end attachment assembly.

In accordance with a further aspect of the invention, the strap wrenches have torsional force applied, and are held in close adjacency with each other and the anchor nut, by means of a tie rod assembly. More specifically, a plurality of tie rods, preferably two, are integrally attached at their proximal ends to the anchor nut. The distal ends of the tie rods are threaded to each receive a tie rod nut.

Each strap wrench has a pair of arms, each arm including an aperture adapted to receive one of the tie rods. Advantageously, an end plate or washer is positioned outside the strap wrench most remote from the anchor nut to clamp the attachment assembly together. The washer includes holes positioned so as to allow the tie rods to pass through.

Each strap wrench includes a cross bar engaging a portion of a strap. A portion of the strap is folded over on itself (doubled), and envelopes the torsion bar. The arms and cross bar form a cam to tighten the wrench. A loop formed by the strap engages the torsion bar. The free portion of the strap extends through the cavity between the legs. Another loop of the strap engages and is anchored by the tie rod passing through the strap wrench. The friction of the overlapping portions of the strap is adapted to preclude relative sliding motion. In addition, the overlapping portions can be attached together by sewing or gluing once the initial grip has been imposed on the rod.

When torque is applied to the anchor nut, the tie rods are urged to rotate in the direction of the applied twisting force. The strap wrench tends to rotate in response to the movement of the tie rods. The cross bar rotates with the arms, and the wrench cams or presses more firmly against the engaging strap.

The resulting motion of the cross bar forces the engaging strap to securely tighten around the torsion bar. The torque results in a tighter and tighter grip around the torsion bar. This action adequately compensates for the dimensional change of the torsion bar. Especially by spreading the gripping action over two wrenches, there is a significant improvement in preventing a failure between the attachment assembly and the torsion bar.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing:

FIG. 3 is an enlarged exploded view of the end attachment assembly according to this invention;

FIG. 3A is an enlarged exploded view of the end attachment assembly according to this invention similar to FIG. 3, but shown from the opposite direction;

FIG. 4 is a cross sectional view taken generally along the plane indicated by lines IV—IV in FIG. 3 with the tie rod being shown as engaging the strap wrench; and FIG. 4A is a cross sectional view taken generally along the plane indicated by lines IV'—IV' in FIG. 3 with the tie rod being shown as engaging the strap wrench.

Reference will now be made in detail to the present preferred embodiment of the invention, an example of which is illustrated in the accompanying drawing.

DETAILED DESCRIPTION OF THE INVENTION

Figure 1:
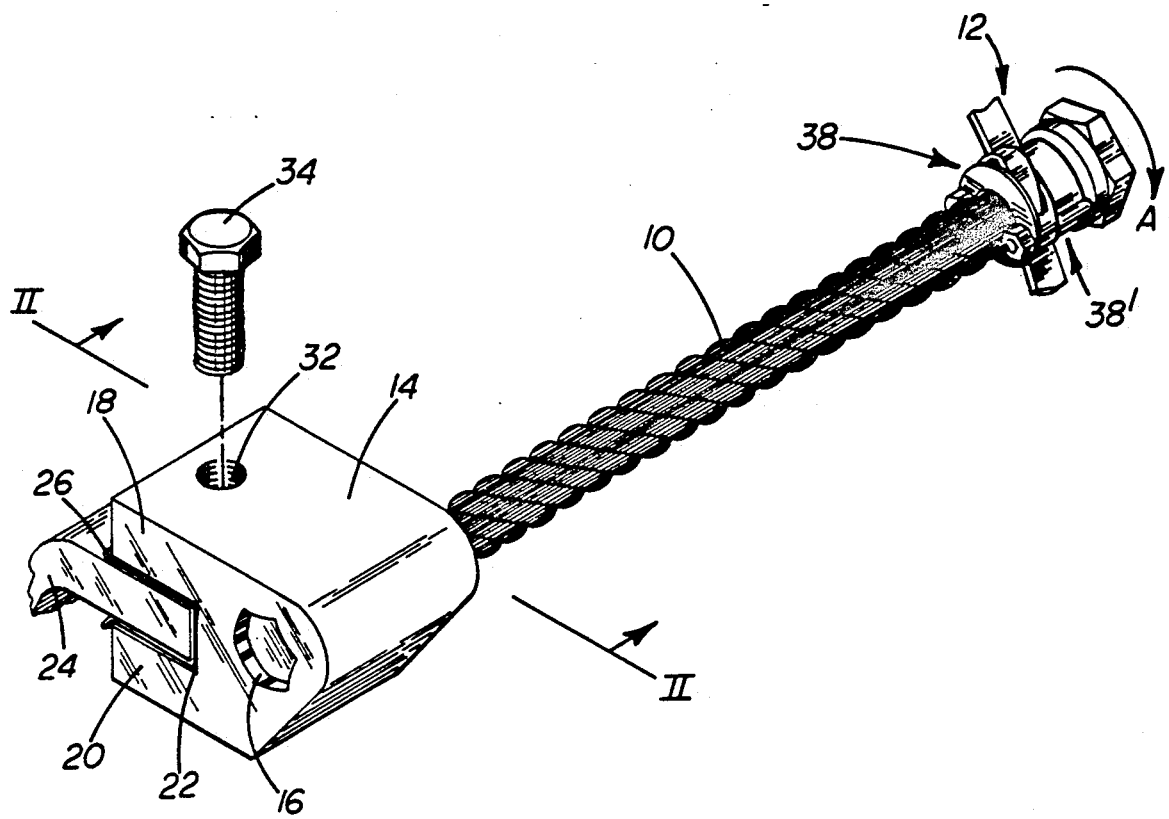
FIG. 1 is a perspective view of a twisted rope torsion bar attached at one end to a mounting block of a sprung mass and further showing at the opposite end an end attachment assembly according to this invention in full view.
Figure 2:
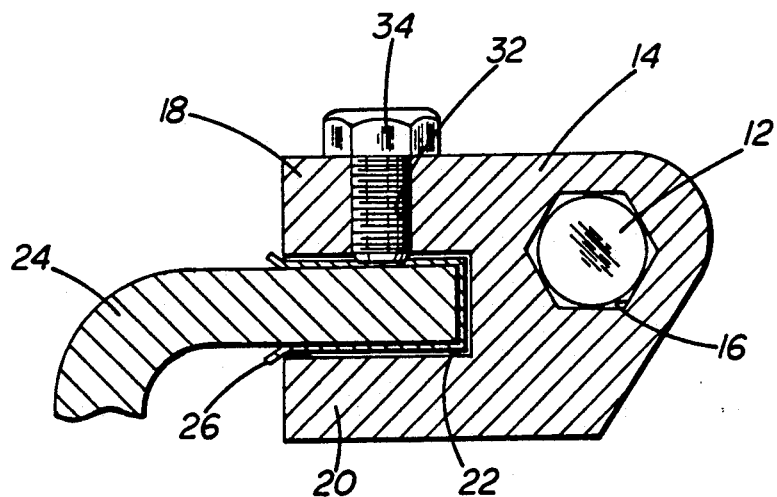
FIG. 2 is a cross sectional view taken generally along the plane indicated by lines II—II in FIG. 1.

Reference is now made to the drawing and particularly to FIG. 1 where a twisted rope torsion bar 10 appears as a component in a system for springing a mass, such as in a vehicle suspension system. An end attachment assembly, generally designated as 12, cooperates with the torsion bar 10 and serves to connect the torsion bar with another component of the system containing the sprung mass. The assembly 12 is shown securing the proximal end of the torsion bar 10 to a mounting block 14 having a mounting bore 16 that is cooperatively shaped. That is, the assembly 12 is hexagonally shaped to be retained within a hexagonal bore 16 in the mounting block 14, thus foreclosing relative rotation between the torsion bar 10 and the mounting block 14.

The mounting block 14 may take any suitable form, such as including upper and lower legs 18, 20 in spaced relation defining a slot 22 for cooperatively receiving a mounting web 24. A U-shaped clip 26 envelopes the mounting web 24 and assists in providing a secure engagement within the mounting block 14.

The mounting block 14 also includes a threaded aperture 32 adapted to receive a bolt 34. The force exerted by the base of the bolt 34 as the bolt 34 is threadingly tightened into the mounting block 14 provides further positive retention of the mounting web 24 within the slot 22.

Another end attachment assembly 12 is also shown in full perspective view attached to the opposite or distal end of the twisted rope torsion bar 10 in FIG. 1. It can be appreciated that if the distal end of the torsion bar 10 is attached to a support precluding any rotational movement, the load applied to the torsion bar 10 comes only from motion associated with the mounting web 24 at the proximal end of the torsion bar 10. The loading provided by the mounting web 24 is in one direction, such as counter to the weight and normal springing action of the vehicle. Advantageously in this situation, the torsion bar 10 is preloaded in the same direction as the anticipated applied torque. More specifically, during assembly, the torsion bar 10 is twisted beyond the zero torque or relaxed position This provides the necessary support and the spring action over the full range of anticipated travel during use.

It can be visualized alternatively that the distal end attachment assembly 12 of FIG. 1 may be secured to another mounting block cooperating with a torque input means (not shown), thus imparting the torque depicted by action arrow A.

Reference is now made to FIGS. 3 and 3A where the preferred embodiment of the end attachment assembly 12 is more clearly shown The end attachment assembly 12 includes an anchor or end nut 36 and a plurality of strap wrenches 38, 38'. The anchor nut 36 and strap wrenches 38, 38' cooperatively interact as will be described in detail below to transmit torque to or from the torsion bar 10. As indicated above, the input torque may be applied to either end of the bar 10. The novel interaction of these components prevents the critical build-up of stresses at the end of the torsion bar 10 that could otherwise lead to failure.

Conventional end attachment assemblies utilize a metal anchor having a high modulus of elasticity to provide strength to the connection. The anchor normally includes a bore for receiving a torsion bar having a low modulus of elasticity to provide resilience in an attempt to adequately perform its function. It can be appreciated that following assembly and when torque is applied in the working environment, the torsion bar deflects to a much greater extent than the metal anchor. This creates a concentration of stresses at the attachment interface between the torsion bar and the metal anchor, possibly leading to torsion bar failure.

The relative deflection difference is increased when the torsion bar is fabricated of a fiber glass/epoxy composite material providing greater elasticity and resilience. Thus, it can be seen that the connection between the attachment assembly and the torsion bar becomes even more critical. The end attachment assembly 12 according to this invention provides the beneficial strength requirement for durability, while cooperatively responding to the elasticity and resilience of the composite, twisted rope torsion bar 10. This feature, along with spreading the clamping force over the width of at least two wrenches reduces the stress concentration at the attachment interface.

The anchor nut 36 is formed of metal, whose high modulus characteristic introduces strength to the attachment assembly 12. The nut 36 has a plurality of tie rods 40, 40' whose proximal ends 42, 42' are integrally attached, as shown in FIG. 3A. The tie rods 40, 40' have a threaded distal end 44 adapted to receive tie rod nuts 46.

An end plate or washer 48 is positioned between the tie rod nuts 46 and the strap wrench 38 most remote from the anchor nut 36. The washer 48 includes holes cooperating with the tie rods 40, 40'. The washer 48 acts to clamp the assembly together.

Each strap wrench 38, 38' includes a strap 52, 52', a pair of arms 56, 56' and a base 58, 58'. As best shown in FIGS. 3 and 3A, the arms 56 extend from the base 58. The ends of the arms 56 most remote from the base 58 are connected by a cross bar 60 to form the cam, as best shown in cross section in FIG. 4. It can be appreciated that the camming action of the two wrenches 38, 38' acts in concert as torque is applied, gripping the torsion rod 10 and resiliently resisting the force, as depicted in FIGS. 4 and 4A, respectively.

A cavity 62, 62' is defined by the base 58, 58', the cross bar 60, 60' and the arms 56, 56'. It can also be appreciated by viewing FIGS. 4 and 4A that the tie rods 40, 40' pass through the respective cavity 62, 62'. Advantageously, the cavity 62, 62' provides a passage allowing the strap 52, 52' to extend through to form a free end and allows a loop of the strap 52, 52' to wrap around the tie rods 40, 40' cooperatively associated with that particular strap wrench 38, 38'.

While two strap wrenches 38, 38' are shown for simplicity, it can be appreciated that any number of strap wrenches 38, 38' may be employed. The preferred embodiment of the invention contemplates the use of an even number of strap wrenches 38, 38'. Each pair of strap wrenches 38, 38' are oriented to be 180° out of phase with each other; that is, the free ends of straps 52, 52' extend in opposing directions. This orientation allows for the end attachment assembly 12 to exert a balanced compressive force on the torsion bar 10 as the individual strap wrenches 38, 38' positively respond to the application of torque, as will be fully described below.

Referring again to FIG. 3A, it can be visualized that the end of the torsion bar 10 is attached to a support precluding rotational motion. When torque is applied to the anchor nut 36 (as shown by action arrow B), the torsion bar 10 resists the twisting force through the interaction of the attachment assembly 12, inducing an opposing resisting force (as shown by action arrow C). The opposing twisting force sets up a twisting moment defining the energy storage capability of the torsion bar.

It can be appreciated that the application of torque inherently tends to reduce the diameter of the twisted rope torsion bar 10. The responsive action of the strap wrenches 38, 38' not only compensates for the diametral change of the torsion bar 10 but also imparts a positive tighter grip on the torsion bar 10.

More specifically, when torque is applied to the anchor nut 36, as depicted by action arrow B in FIG. 3A, the tie rods 40, 40' are urged to rotate a like amount in that direction. The engagement of the tie rods 40, 40' with the arms 56, 56' cause the camming action to tighten both wrenches 38, 38'.

In the preferred embodiment of the invention, the straps 52, 52' are fabricated of a material that has a very high coefficient of friction. This means that its surface resists relative sliding motion with respect to its own surface or the surface of another component. Consequently, each wrench responds to the application of torque to the anchor nut 36 by rotating slightly and camming in the direction of action arrow B in FIG. 3A. During initial set up, the wrenches can be adjusted in position by releasing the tension and pulling on the free end of the strap 52, 52' to properly tighten. During service the wrenches 38, 38' may be readjusted if necessary. However, in most applications, this is not necessary or desirable and the straps 52, 52' may be integrally attached together, as by sewing or gluing.

This gripping action is more fully described with reference to FIGS. 4 and 4A. Action arrows D and D' describe the direction of the rotating/pivoting action of each wrench 38, 38'. As can be seen in those figures, each strap 52, 52' winds around the torsion bar 10 and overlaps itself in the area of engagement with the cross bar 60, 60'. A portion of the strap also divides and winds around the tie rod 40, 40'. Since the strap 52, 52' advantageously has a very high friction coefficient, the strap 52, 52' tends to resist relative movement against the tie rod 40, 40', the torsion bar 10, the cross bar 60, 60' and against itself in the area of overlap. The strap 52, 52' may be fabricated of any material with a high frictional coefficient and the requisite tensile strength.

The straps 52, 52' apply the beneficial compressive force to the torsion bar 10. More specifically, as each wrench rotates/pivots, the cross bar 60, 60' is rotationally/pivotally cammed against the engaging portion of the strap 52, 52'. Since the strap 52, 52' resists sliding over the torsion bar 10 and against itself in the overlap region, the strap 52, 52' is tensioned to contract around the torsion bar 10 and provide a tighter grip. This compressive action and load distribution of the strap wrenches 38, 38' on the torsion bar 10 assures a firm grip. This concept also reduces the chance of failure of the torsion bar 10 by reducing the stress build-up at the interface.

In summary, numerous benefits result from employing the concepts of the present invention. The end attachment assembly 12 includes an anchor nut 36 in combination with a plurality of strap wrenches 38, 38' to tightly engage and positively grip the torsion rod 10. The torque compressing the torsion bar 10 compensates for the reduction in the diameter of the torsion bar 10 and prevents stress concentration.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A strap wrench end attachment assembly in combination with a twisted rope torsion bar, comprising:
    an anchor nut connecting to a mounting means for a sprung mass;
    means for attaching said anchor nut to said twisted rope torsion bar, including a plurality of tie rods;
    a plurality of strap wrenches operated by said tie rods;
    said strap wrenches gripping said twisted rope torsion bar, and being adapted to compress said twisted rope torsion bar when torque is applied;
    whereby secure and firm compressive engagement is continuously maintained between said end attachment and said twisted rope torsion bar to transmit torque for shock absorption and reduce the stress concentration at the attachment interface.

2. The end attachment assembly of claim 1 wherein there is further provided a washer attached to said tie rods for securing said strap wrenches together.

* * * * *